UNITED STATES PATENT OFFICE.

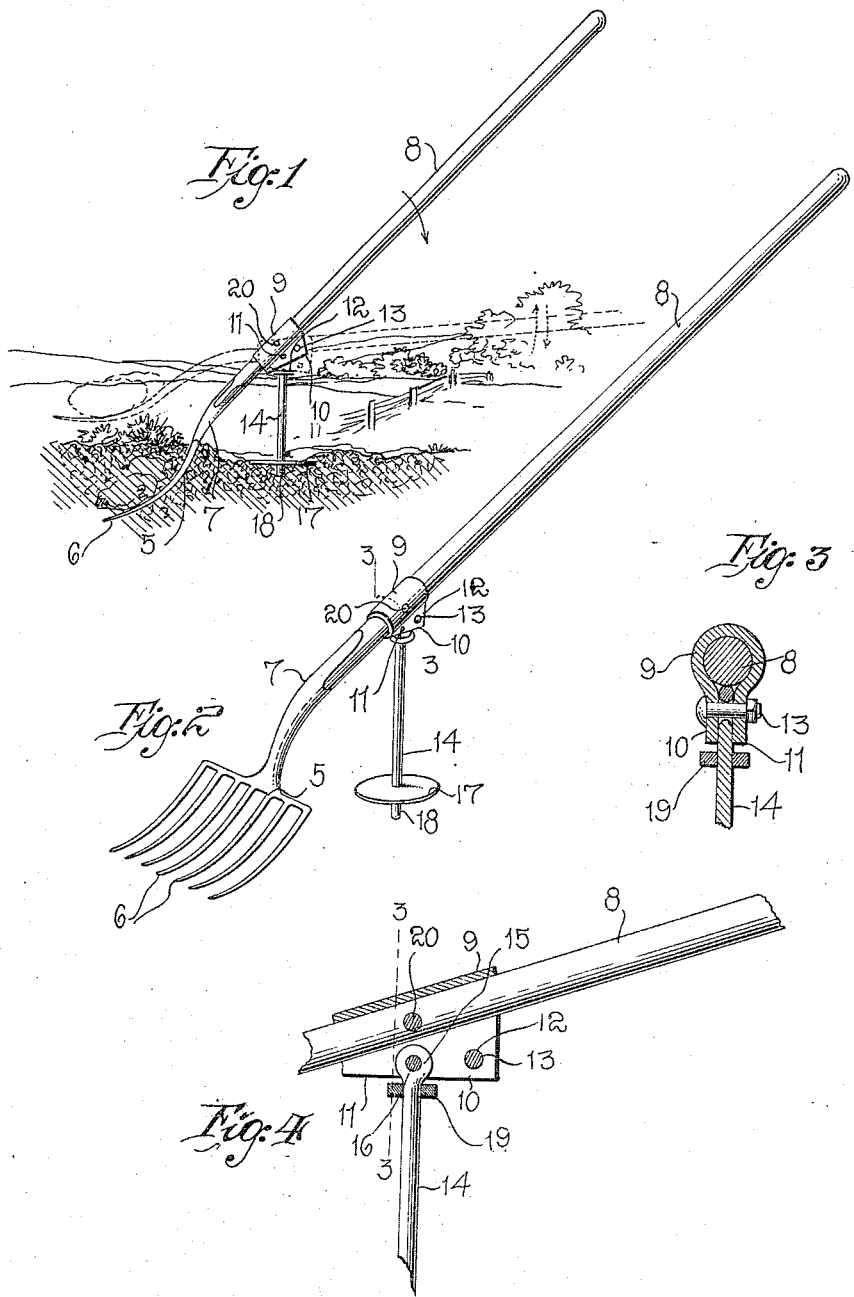

ATUS L. K. H. BEKKE, OF SIDNEY, MICHIGAN.

POTATO-FORK.

1,296,738.  Specification of Letters Patent.  Patented Mar. 11, 1919.

Application filed November 13, 1918. Serial No. 262,373.

*To all whom it may concern:*

Be it known that I, ATUS L. K. H. BEKKE, citizen of the United States, residing at Sidney, in the county of Montcalm and State of Michigan, have invented certain new and useful Improvements in Potato-Forks, of which the following is a specification.

This invention relates to forks for digging potatoes and the like and has for its object to provide a comparatively simple and thoroughly efficient device of this character the construction of which is such as to take the average potato hill at one operation or stab of the fork and thereby materially facilitate and expedite the removal of the potatoes from the hill.

A further object of the invention is to provide means depending from the handle of the fork for supporting said fork during the digging and lifting operation and means for limiting the tilting movement of the fork.

A further object is to provide a fork support including a clamp mounted on the handle of the fork and provided with a depending standard, the lower end of which is provided with an anchoring shoe for engagement with the ground, said clamp being adjustable longitudinally of the handle so as to permit the fulcrum or leverage of the fork to be varied or regulated at will.

A still further object of the invention is generally to improve this class of devices so as to increase their utility, durability and efficiency.

Other and incidental objects will appear during the course of the detailed description of the invention. In the drawings, wherein I have illustrated the preferred embodiment of the invention, and wherein similar reference characters designate corresponding parts throughout the several views:

Figure 1 is a side elevation of my improved potato fork showing in full lines the tines of the fork within a potato hill and in dotted lines the position assumed by the fork when lifting the potatoes from the hill, Fig. 2 is a perspective view of the potato fork, Fig. 3 is a transverse sectional view taken on the line 3—3 of Fig. 4, and Fig. 4 is a longitudinal sectional view of Fig. 3.

The heads of hand potato diggers or forks as at present constructed are relatively narrow and consequently will not entirely span the average potato hill with the result that it is necessary to search several times in the same hill in order to be sure that all of the potatoes have been removed therefrom. Moreover, as such potato diggers are operated by hand, the labor and strain incident to lifting the potatoes from the hill and shaking the fork to remove excess earth soon tires the operator and necessitates cessation of work at relatively short intervals for recuperation.

The present invention aims to provide a potato digger the head of which is formed with a sufficient number of tines to entirely span the average potato hill so as to effectually remove all of the potatoes from the hill at one operation or stab of the fork and also to provide means for supporting the handle of the fork during the digging and lifting operation so as to relieve the operator of the weight of the load of potatoes on the fork when shaking the latter to remove the excess earth.

The invention comprises a head including a frame 5 having a plurality of spaced tines 6 secured thereto in any suitable manner and preferably seven in number so that the head of the fork will be of sufficient width to entirely span an average potato hill. Secured to or formed integral with the frame 5 is a socket 7 in which is secured in any suitable manner an operating handle 8. Slidably mounted on the handle 8 is a clamping member 9, the latter being preferably constructed from a single sheet of metal having its intermediate portion bent into cylindrical form to receive the handle 8 and its opposite ends bent downwardly in spaced parallel relation to form coacting clamping ears 10. The lower edges 11 of the clamping ears 10 are preferably disposed at an angle to the longitudinal plane of the body portion 9 and said ears are pierced by one or more transversely alined perforations 12 through which extend bolts or similar fastening devices 13. Depending from the body 9 is a rod or standard 14, the upper end of which is enlarged laterally at 15 and provided with a central opening 16 adapted to receive the adjacent bolt 13, which bolt forms a pivotal connection between the standard and handle 8 and also constitutes the fulcrum upon which the fork is tilted in the act of digging or stabbing the potato hill and removing the potatoes therefrom.

Secured to or formed integral with the rod or standard 14 is a traction shoe 17, preferably in the form of a circular disk, said disk being spaced from the lower end of the rod to form an anchoring lug 18. The lug 18 is adapted to be embedded in the surface of the ground at the point where the fork is to be used and serves to prevent accidental displacement of the standard while the traction shoe or disk 17 bears against the upper surface of the ground and serves to prevent the spindle from being driven too far into the earth. At the upper end of the standard 14 and immediately below the head 15, is an annular collar or shoulder 19, the upper face of which coacts with the lower edges 11 of the clamping ears 10 for the purpose of limiting the tilting movement of the fork in the act of entering the ground or lifting the potatoes from the hill and shaking the same to remove the earth therefrom. The clamp 9 is adjustable longitudinally of the handle 8 so that the fulcrum of the handle may be changed at will and the leverage consequently varied to adapt the device to different conditions of service. The bolts 13 will ordinarily be sufficient to hold the clamp 9 in its different positions of adjustment on the handle but in order to positively prevent any movement of the clamp 9 after having once been adjusted on the handle, I provide a screw or similar fastening device 20 which extends through the body of the clamp and into the handle, as shown. It will thus be seen that by embedding the lower end of the standard in the ground at a point adjacent a potato hill and moving the free end of the handle 8 upwardly, the tines 6 of the fork will enter the ground when, by depressing the free end of the handle, the head of the fork will be lifted above the hill, carrying thereon the potatoes removed from said hill, and in which position the earth may be readily separated from the potatoes by imparting a quick reciprocatory movement to the free end of the handle, as will be readily understood.

It will thus be seen that the entire weight of the potatoes on the head of the fork will be carried by the standard 14 so that the operator is relieved of the necessity of manually lifting the potatoes each time they are removed from the hill. The device is extremely simple in construction and by the use of such device the operator is effectually relieved of all strains incident to the employment of ordinary hand potato diggers.

Having thus described the invention, what is claimed as new is:

1. A potato fork comprising a head, a handle secured to the head, a clamp carried by the handle and provided with spaced depending ears the lower edges of which are disposed at an angle to the longitudinal plane of the clamp, a standard pivotally mounted between the ears to permit tilting movement of the handle thereon, and a shoulder on the standard and adapted to bear against the lower edges of the ears for limiting the tilting movement of said handle.

2. A potato fork including a head, a handle secured to the head, a clamp adjustable longitudinally of the handle and provided with spaced depending ears the lower edges of which are disposed at an angle to the longitudinal plane of the clamp, a standard pivotally mounted between the ears and having its lower end provided with a lug adapted to enter the ground, a traction shoe spaced from the lug and adapted to bear against the surface of the ground, and means carried by the upper end of the standard and adapted to bear against the edges of the ears for limiting the tilting movement of the handle.

3. A potato fork comprising a head, a handle extending from the head, a clamp adjustable longitudinally of the handle and including a cylindrical body portion having its ends bent inwardly and downwardly to form spaced depending ears the lower edges of which are disposed at an angle to the longitudinal plane of the cylindrical portion, spaced bolts connecting the ears, and a standard fitting between the ears and provided with an opening adapted to receive one of said bolts, the lower end of the standard being provided with a traction shoe terminating in a depending lug adapted to be embedded in the surface of the ground for preventing accidental displacement of the standard.

4. A potato fork comprising a head having a handle extending longitudinally therefrom, a clamp slidably mounted on the handle for longitudinal adjustment with respect thereto and including spaced ears having their lower longitudinal edges disposed at an angle to the longitudinal axis of the handle and provided with spaced transversely alined openings, a standard having an enlarged head fitting between the ears and provided with an opening adapted to register with the adjacent transverse openings in the ears, bolts passing through said openings, one of the bolts serving to pivotally connect the clamp to the standard, a traction disk spaced upwardly from the lower end of the standard, a stop collar spaced from the head of the standard and adapted to bear against the lower edges of the ears for limiting the tilting movement of the handle, and means extending through the body of the clamp and engaging said handle for securing the clamp in adjusted position thereon.

5. A potato fork comprising a head formed of spaced tines, said head being of sufficient width to entirely span a potato hill, a handle connected with the head, a clamp adjustable longitudinally of the handle and provided with spaced depending ears, the lower edges of which are disposed at an angle to the longitudinal plane of the clamp, a standard having its upper end pivotally mounted between the ears to permit tilting movement of the handle thereon, a traction shoe spaced from the lower end of the standard, and a shoulder on said standard immediately below the pivoted end thereof and adapted to bear against the lower edges of the ears for limiting the tilting movement of said handle.

In testimony whereof I affix my signature.

ATUS L. K. H. BEKKE. [L. S.]